United States Patent [19]
Nagoshi et al.

[11] Patent Number: 5,203,657
[45] Date of Patent: Apr. 20, 1993

[54] SELF-TAPPING SCREW

[75] Inventors: Eiichi Nagoshi, Chigasaki; Osami Iwasaki; Tetuya Akashi, both of Hatano, all of Japan

[73] Assignee: Topura Co., Ltd., Osaka, Japan

[21] Appl. No.: 876,436

[22] Filed: Apr. 29, 1992

[30] Foreign Application Priority Data

May 29, 1991 [JP] Japan ................................. 3-152284

[51] Int. Cl.⁵ ........................ F16B 23/00; F16B 35/06
[52] U.S. Cl. ................................... 411/399; 411/188; 411/386; 411/404; 411/919
[58] Field of Search ............................... 411/402–404, 411/410, 386, 387, 399, 919, 188, 187

[56] References Cited

U.S. PATENT DOCUMENTS

| 366,158 | 7/1887 | Dow | 411/399 |
|---|---|---|---|
| 1,151,861 | 8/1915 | Brumback | 411/399 |
| 3,221,588 | 12/1965 | Wieber | 411/387 |
| 4,355,552 | 10/1982 | Gutshall | 411/404 |
| 4,655,661 | 4/1987 | Brandt | 411/399 |
| 4,693,654 | 9/1987 | Bettini | 411/387 |

FOREIGN PATENT DOCUMENTS

| 268961 | 6/1988 | European Pat. Off. | 411/399 |
|---|---|---|---|
| 158599 | 3/1904 | Fed. Rep. of Germany | 411/403 |
| 1112810 | 5/1968 | United Kingdom | 411/399 |

Primary Examiner—Neill R. Wilson
Attorney, Agent, or Firm—Kanesaka and Takeuchi

[57] ABSTRACT

A shape of the head part of the screw is improved and performance of insertion of the screw when punched and performance of fastening of the screw when seated as well as a finishing treatment upon completion of the fastening against a fastened member are improved.

The head part is made such that the upper surface having an engaging groove to with which a screw driver tool is engaged has a spherical surface, and the head part is comprised of an upper large diameter part formed with a first seat surface of inverse truncated cone shape having an outer circumference of a curved concave surface and a small diameter part formed with a second seat surface of an inverse truncated cone shape concentrically and integrally connected to a lower part of the large diameter part and having its outer circumference of a curved concave surface, and an annular projecting edge is formed at a connection part between the seated surfaces of the two-stage curved concave surfaces. The upper surface of the head part formed into the spherical surface is provided with a plurality of chamferred surfaces formed by recessing the edge part of the opening of the engaging groove into a cone shape. There are provided a plurality of spot facing projections extending in a longitudinal direction along the curved concave surface of the second seat surface.

4 Claims, 3 Drawing Sheets

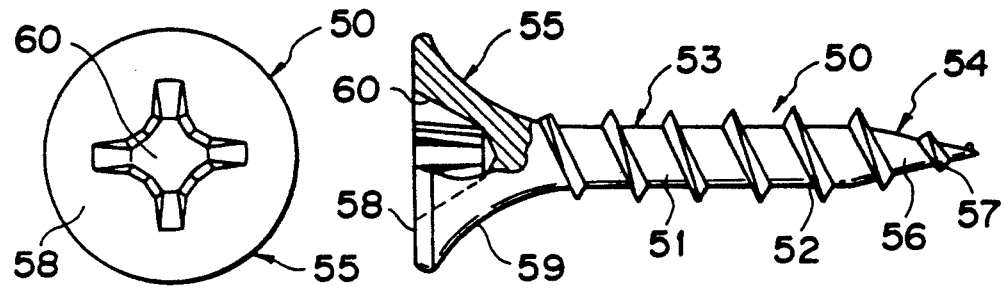
FIG. 7(a)  FIG. 7(b) PRIOR ART
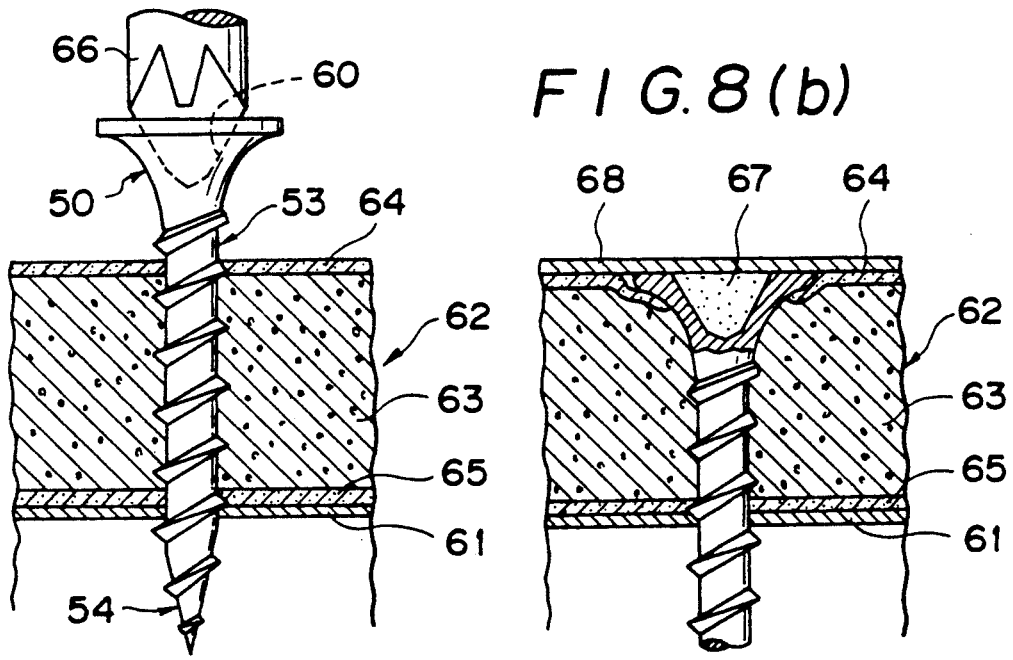
FIG. 8(a) PRIOR ART
FIG. 8(b)
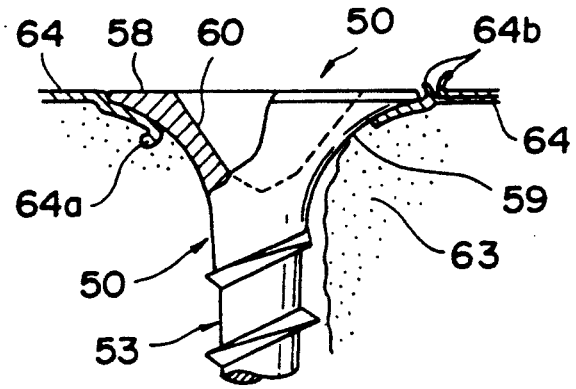
FIG. 9 PRIOR ART

SELF-TAPPING SCREW

BACKGROUND OF THE INVENTION

1. Field of the Invention

This invention relates to an improvement of a screw or self-tapping screw which is suitable for fastening a panel member as a building wall or a ceiling or the like, for example, to a ground material at a main structure side.

2. Description of the Prior Art

This type of screw or self-tapping screw in the prior art is defined in general as a dry wall screw or the like and constructed as shown in FIG. 7, for example. This screw 50 is used for fastening a panel member such as a gypsum board 62 applied under tension over a surface of a steel ground material 61 of a light weight type steel or the like constituting an edge of a structure at a main structure side such as a building wall or a ceiling as shown in FIG. 8, for example.

As this ground material, in addition to the aforesaid steel ground material 61, there are wooden structural materials such as wood or particle board and further as a panel member, there are a plywood, a hard board, a flexible board or the like in addition to the aforesaid gypsum board 62.

However, the screw of the present invention can be used for fastening various types of panel members to various types of ground materials and in particular the most preferable effect can be attained if the present invention is applied to a steel ground material having a thin wall, a hard panel and a fragile gypsum board.

The screw of the prior art type described above is comprised of a screw shaft part 53 having threads 52 at an outer circumference of a shaft part 51 of a straight column-like shape, a drilling part 54 connected to an extreme end of the screw shaft part 53 and a head part 55 arranged at a rear end part of the screw shaft part 53.

The drilling part 54 is formed with a tapered shaft part 56 formed to have a gradually decreased diameter from the shaft part 51 toward its extreme end, and an extreme end thread 57 connected to the thread 52 at an outer circumference of the tapered shaft part 56, wherein the fastening is carried out while the drilling part 54 cooperates with the screw shaft part 53 to perform a punching and a threading.

The aforesaid head part 55 has a circular shape at a flat upper surface 58 of which outer circumferential edge is concentrically projected widely in a radial direction from the aforesaid shaft part 51, and the head part 55 is provided with an engaging groove 60 such as a cross-shaped hole where a screw driver tool is engaged with a central part of the upper surface 58. A seat surface 59 of the head part 55 extending from the outer circumferential edge of the upper surface 58 to the aforesaid shaft part 51 is formed with an inverse truncated cone having a curved concave surface in which its outer circumference is gradually decreased in its diameter, converged into a shaft diameter of the shaft 51 and gently sloped along an axial direction so as to hold the gypsum board 62 with a strong holding force upon completion of the fastening action, i.e., an entire shape of the head 55 is formed in a trumpet-shape.

The screw to which the present invention pertains is not limited to a tapping screw structure as described above, but it can be applied to a screw of a self-drilling structure in which a drilling part having a drill end acting as a self-punching action similar to that of the general type of a drill blade is formed at an extreme end of the aforesaid screw shaft part, the drilling part performs a punching action and the thread, 52 of the screw shaft part 53 are subsequently applied for making a screw setting, for example, a self-tapping screw disclosed in the gazette of Jap. U.M. Publn. No. Hei 2-29294.

As described above, in case that the panel member is the gypsum board 62, an additive agent is added to the gypsum of the base material. Since solidified into a plate form and the gypsum board is fragile, the protection sheets 64 and 65 having superior adhering characteristic and coating characteristic such as a cardboard or a fiber or the like are applied to both surfaces of the gypsum plate 63 with an adhesive agent.

When the gypsum board 62 is to be fixed, as shown in FIG. 8 (a), an extreme end of the screw driver tool 66 is engaged in the engagement groove 60 of the screw 50, the screw driver tool 66 is rotated and the part 54 of the screw 50 is pierced into the gypsum board 62. With such an arrangement, the drilling part 54 reaches the steel ground material 61 while punching in sequence against the gypsum board 62, the punching and threading are carried out in the steel ground material 61, subsequently the screw shaft part 53 is threadably fitted to the steel ground material 61, and the upper surface 58 of the head part 55 is in flush with the surface of the gypsum board 62, or preferably the fastening is completed while the upper surface is being slightly recessed as shown in FIG. 8(b). After this state, the upper surface 58 of the head part 55 containing the engaging groove 60 and the recessed surface of the gypsum board 62 generated at an outer circumferential edge are filled with a putty coating 67 so as to make a uniform surface, and finishing for applying a cloth or a paint over an entire surface area of the gypsum board 62 is made so as to perform a finishing process with an ornamental material 68.

However, in case of the screw 50 having the structure of the prior art as described above, the screw has the following several problems to be resolved.

At first, in case of the aforesaid screw 50, the upper surface 58 of the head part 55 is formed flat, and an engaging groove 60 with which the screw driver tool 66 is engaged is recessed at the upper surface 58, so that an installing fitness for the screw driver tool 66 is insufficient.

In recent years, a screw driver tool 66 has been frequently used under a condition that the screws 50 intermittently supplied in sequence are rotationally driven by an electrical screw driver of high speed rotation so that the screw fastening operations can be efficiently carried out at several locations. Accordingly, if the extreme end of the screw driver tool 66 is not accurately fitted to the engaging groove 60, the engaging groove 60 is damaged or dropped out and a screwing with a desired rotational torque can not be carried out. Due to this fact, the screw is fastened while the upper surface 58 of the head part 55 is floated up away from the surface of the gypsum board 62, a sufficient supporting force may not be attained for the gypsum board 62 and a finishing process with the ornamental material 68 is troubled as described below.

In case of the aforesaid screw 50, the drilling part 54 at the extreme end thereof is formed with a sharp shape in order to improve a performance of screwing action during a punching operation, a carbon sintering treatment is carried out for the screw and at the same time the seat surface 59 of the screw is formed with a trumpet shape so that the gypsum board 62 can be pressed with a strong holding force on completion of the fastening work.

However, since the seat surface 59 has no cutting capability and an entire circumferential surface of the seat surface 59 is concurrently contacted with the gypsum 63 during the screwing action so as to act as a substantial resistance it requires a substantial thrusting force (a pushing). Consequently, there is a possibility that an application of excessive thrust force causes the thread formed in the steel ground material 61 to be destroyed or the screw is fastened while the upper surface 58 of the head 55 is being floated away from the surface of the gypsum board 62.

In particular, in the event that a thickness of the steel ground material 61 is thin and the gypsum board 62 has a high hardness, even if a cutting force of the drilling part 54 is improved as described above and a screwing torque for use in punching the steel ground material 61 is reduced, it becomes necessary to provide a larger thrusting force than the screwing torque for pushing the head part 55 as described above, resulting in that the thread screwed at the steel ground material 61 is damaged and the screw 50 runs idle. As a result, the screw is fastened with the upper surface 58 of the head part 55 floated up away from the surface of the gypsum board 62, a sufficient supporting force can not be attained for the gypsum board 62, and at the same time a certain trouble may occur in a finishing process with an ornamental material 68 as described below.

It is preferable that a height of the upper surface 58 of the head part 55 upon completion of the fastening operation is in such a degree to be slightly concaved from the surface of the gypsum board 62 so as to enable the concave surface to be repaired with a putty coating 67. However, the upper surface 58 of the head part 55 is projected from the surface of the gypsum board 62 due to the aforesaid reasons, or the height of the upper surface 58 of the head 55 in respect to the surface of the gypsum board 62 is not made constant due to characteristics of the steel ground material 61 and the gypsum board 62 as well as irregularity in the fastening force. Due to this fact, the upper surface 58 of the head part 55 is projected, resulting in that the projected surface can not be repaired with the putty coating 67 and even in the case of the flushed surface, the metallic surface has a poor putty applicability thereon. Further, the upper surface 58 of the head part 55 may not be applied with the putty coating 67 in sufficient thickness and so the putty coating 67 may easily be peeled off when dried, and even if a finishing process with an ornamental material 68 is carried out, some irregular corrugated portions are generated and a uniform and superior finished surface can not be attained.

The protection sheet 64 broken by a screwing action of the screw 50 is brought into the gypsum 63 by a pushing action of the head part 55, the protection sheet 64 is peeled off as it is and as shown in FIG. 9, the peeled-off partial broken piece 64a can not be pressed with the seat surface 59 but wound around the seat surface 59 in an irregular state, resulting in that upon completion of the fastening operation of the screw, a seating state of the seat surface 59 is made inferior and the seating is made unstable while the head part 55 is inclined or floated and then its supporting force against the gypsum board 62 is reduced.

In addition, the partially bulged-out and finely peeled piece 64b protrudes outwardly from an outer circumferential edge of the head part 55 upon completion of fastening operation. If the finishing process with the putty coating 67 or the ornamental material 68 is carried out while the peeled piece 64b is being kept as it is, some corrugated portions are generated and a uniform and superior finished surface may not be attained, so that a quite troublesome manual operation is required for cutting the corrugated portions or grinding off with a sandpaper.

In view of the foregoing, it is an object of the present invention to provide a screw or self-tapping screw capable of improving these problems.

It is also an object of the present invention to provide a screw or self-tapping screw to which fitting of a screw driver tool can be accurately and easily carried out.

It is a still further object of the present invention to provide a screw or self-tapping screw in which resistance during; a threading operation of the screw is reduced and performance of the threading operation is improved.

It is a still further object of the present invention to provide a screw or self-tapping screw in which an idle rotation of a screw caused by an excessive thrust force is prevented and a supporting force of the screw is improved.

It is an object of the present invention to provide a screw or self-tapping screw in which a head part is buried in a target surface upon completion of a fastening operation and the screw is suitable for a finishing work such as a putty coating or the like.

It is also an object of the present invention to provide a screw or self-tapping screw in which a breakage of a covering protection sheet on the target surface is prevented to improve a supporting force of the screw or self-tapping screw.

It is also an object of the present invention to provide a screw or self-tapping screw which is suitable for preventing a turning-up of a covering protection sheet on the target surface as well as its fine split and for improving a surface finishing work.

Other objects and advantages of the present invention will become apparent from the description of the preferred embodiments in reference to the accompanying drawings.

SUMMARY OF THE INVENTION

A subject matter of the present invention consists in a screw or self-tapping screw in which an extreme end of a screw shaft part is provided with a drilling part of a sharp end or a drill part, a head part arranged at a rear end part of the screw shaft part is formed with an inversely truncated conical shape with its outer circumference being a curved concave surface, an upper surface of the head part is formed with an engaging groove such as a cross-shaped hole to which a screw driver tool is fitted and an upper surface of the head part including an edge of the opening of the engaging groove is formed with a spherical concave surface. The head part is comprised of a large diameter part formed in the midway part from the outer circumferential edge at the upper surface to the thread part and a small diameter part concentrically and integrally connected to a lower part of the large diameter part and formed between the larger diameter part and the screw shaft part, an outer circumference of the small diameter part forms the second seat surface of a curved concave surface in which a curvature at a terminal end near the larger diameter part is high and a starting end near the screw shaft part is gradually decreased with a gradual curvature. The larger diameter part forms the first seat surface with a curved concave surface having a diameter gradually decreased toward the terminal end of the second seat surface with a curvature substantially equal to that of the terminal end of the second seat surface, and a connection part between the first seat surface and the second seat surface is formed with an annular projecting edge.

Another subject matter of the present invention consists in a screw or self-tapping screw in which an upper surface of a head part formed into the aforesaid spherical concave surface is provided with a chamferred part machined to have an inwardly tapered part by cutting an edge of an opening of the cross-shaped engaging groove into a conical shape.

Another subject matter of the present invention consists in a screw or self-tapping screw in which the small diameter part of the head part is provided with a plurality of spot facing projections extending in a longitudinal direction along a curved concave surface of the second seat surface while being equally spaced apart in a circumferential direction and at the same time the top portions of the spot facing projections are located inside the outer circumference of the annular projecting edge.

BRIEF DESCRIPTION OF THE DRAWINGS

FIG. 1 shows a screw or self-tapping screw of one preferred embodiment of the present invention, wherein

FIG. 6(a) shows a state of use of the screw shown in FIG. 4.

FIG. 7 shows a screw or self-tapping screw of the prior art, wherein FIG. 7(a) is a top plan view seen from the head part and FIG. 7(b) is an entire front elevational view with a part being broken away.

FIG. 8 shows the screw of FIG. 7, wherein FIG. 8(a) and FIG. 8(b) are front elevational views in use.

FIG. 9 shows a state of use of the screw shown in FIG. 7.

DESCRIPTION OF THE PREFERRED EMBODIMENTS

Figure 1A:
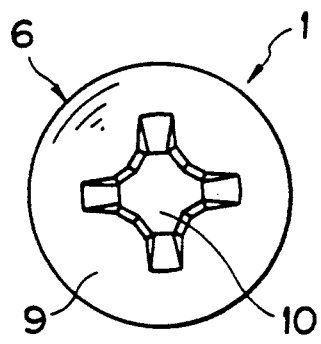
FIG. 1(a) shows a top plan view seen from the head part of the screw and FIG. 1(b) is an entire front elevational view, respectively.

Referring now to the drawings, some preferred embodiments of the present invention will be described in detail.

Figure 1B:
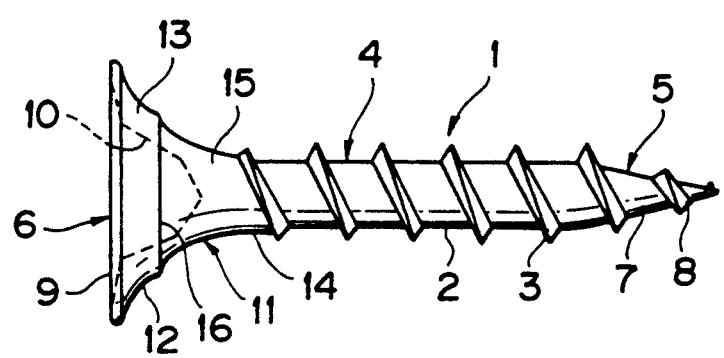

The screw or self-tapping screw is comprised of a screw shaft part 4 formed by projecting threads 3 at an outer circumference of a shaft part 2 having a straight column-like shape as shown in FIG. 1, a drill part 5 connected to an extreme end of the screw shaft part 4 and formed with an extreme end thread part 8 continuous with the thread part 3 at an outer circumference of a tapered shaft 7 at an extreme end of which diameter is gradually decreased from the shaft part 4, and a head part 6 arranged at a rear end of the screw shaft part 4. The screw shaft part 4 and the drill part 5 have the same configuration as that of the screw 50 of the prior art described above.

The head part 6 is provided with an upper surface 9 which is a circle having an outer circumferential edge projected substantially in a radial direction in a concentric manner from the shaft part 2 and formed with a spherical concave surface having its central part mostly concaved, and then a central part of the upper surface 9 is provided with an engaging groove 10 such as a cross-shaped hole to which a screw driver tool is engaged.

Figure 3:
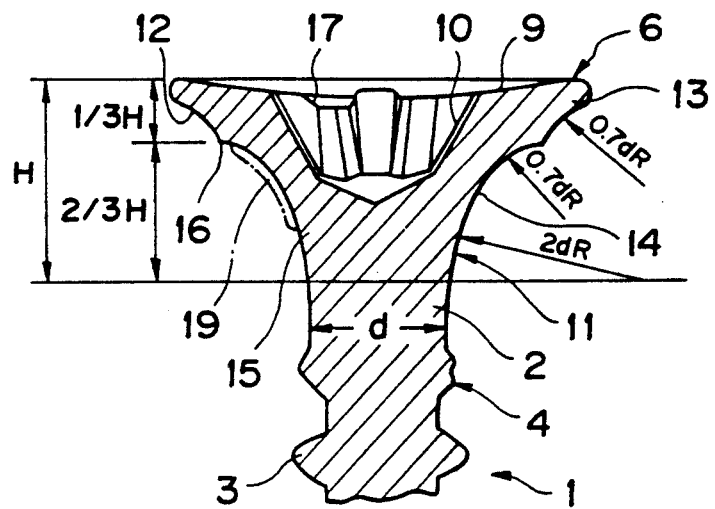
FIG. 3 is an enlarged longitudinal section for showing the head part of the screw shown in FIGS. 1 and 2.

The aforesaid head part 6 is, as shown in FIG. 3, comprised of a larger diameter part 13 formed between an outer circumferential edge of the upper surface 9 and the aforesaid screw shaft part 4, and of a small diameter part 15 integrally connected to a lower part of the large diameter part 13 and formed between the large diameter part 13 and the aforesaid screw shaft part 4.

The small diameter part 15 is formed into an inverse truncated cone shape with its outer circumference being curved in a concave surface as its diameter is gradually decreased from the starting end and terminates at the same diameter as that of the aforesaid screw shaft part 4, and an outer circumference of the small diameter part 15 forms the second seat surface 14. The curved concave surface of the second seat surface 14 is formed in such a way that the terminal end near the large diameter part 13 is rapidly decreased with a small radius of curvature while a tapered angle in respect to an axial direction is increased, and the terminal end near the screw shaft part 4 is formed in such a way as a tapered angle in respect to an axial direction is reduced and its diameter is gradually decreased with a large radius of curvature.

The large diameter part 13 is formed by a curved concave surface of which diameter is reduced toward the small diameter part 15 with a radius of curvature approximately equal to that of the terminal end of the small diameter part 15 and then an outer circumference of the larger diameter part 13 forms the first seat surface 12.

With such an arrangement, the outer circumference of the head part 6 is formed by the seat surface 11 of two-stage curved concave surfaces, and an outer circumference of a connected part between the large diameter part 13 having the first seat surface 12 and the small diameter part 15 having the second seat surface 14 is formed with an annular projecting edge 16.

The head part 6 is formed such that the larger diameter part 13 in this preferred embodiment is formed with to about ⅓ H with respect to a height H defined as a height of the head part converging from the outer circumferential edge of the upper surface 9 to the outer diameter (d) of the shaft part 2, and then the small diameter part 15 is formed with the remaining of about ⅔ H.

The curved concave surfaces of the first seat surface 12 and an initial end of the second seat surface 14 are arcuate forms in their shapes with a small radius of curvature of about 0.7 dR, i.e. about 0.7 times of the outer diameter (d) of the aforesaid shaft part 2, and further the curved concave surface at the terminal end of the second seat surface 14 is in an arcuate form with a large radius of curvature of about 2 dR, i.e. about two times of the outer diameter (d) of the shaft part 2.

Figure 2:
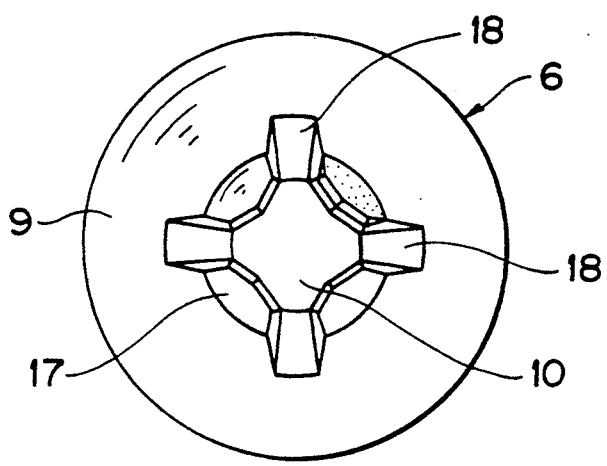
FIG. 2 is a top plan view for showing the head part of another preferred embodiment of the screw of FIG. 1.

In addition, the head part 6 may also have some chamferred portions 17 as shown in FIG. 2 at the upper surface 9 including the engaging groove 10. The chamferred portions 17 are made such that an opening edge between the adjacent wings 18 is cut in a conical shape in respect to a concentric circle traversing at a substantial intermediate part in a raidal direction of each of the wings 18 forming the engaging groove 10 so as to form an inward-directed tapered surface.

In addition, FIG. 3 shows a sectional shape of the head part in FIG. 1(a) having no chamferred portion 17 at a right half portion, and the left half portion shows a sectional shape of the head part shown in FIG. 2 having the chamferred portion 17.

Figure 4:
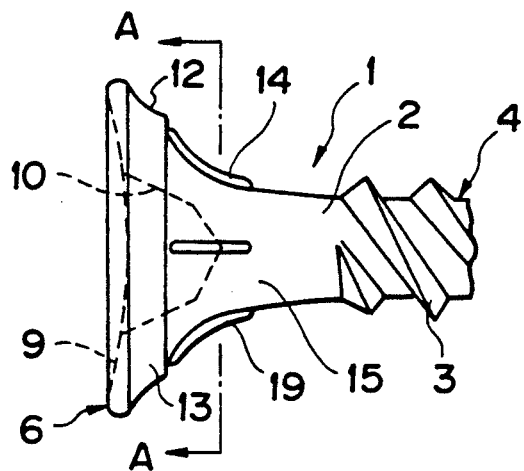
FIG. 4 is a front elevational view for showing a substantial part of a screw or self-tapping screw of another preferred embodiment.

Then, FIG. 4 shows another preferred embodiment of another screw or self-tapping screw in which a shape of the aforesaid head part 6 is further modified, wherein a plurality of spot facing projections 19 are arranged in the small diameter part 15 of the aforesaid screw 1 and other configurations are quite the same as those of the aforesaid screw 1.

Figure 5:
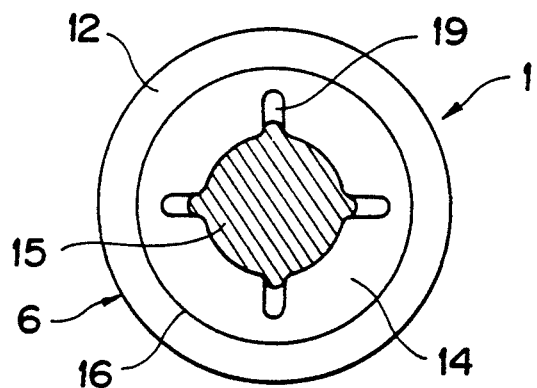
FIG. 5 is a sectional view taken along a line A—A of FIG. 4.

The foresaid spot facing projections 19 are equally spaced apart along a circumferential direction as shown in FIG. 5, for example, they are projected from an outer circumference of the small diameter part 15 with a specified height and width, and extended longitudinally along the curved concave surface of the second seat 14. The top portions of the spot facing projections 19 are positioned inside the annular projecting edge 16 in such a way that they may not be projected from an extended line at the terminal end of the aforesaid first seat surface 12 toward the outer circumference.

When the gypsum board 62 of the panel member is fastened in the same manner as that of the prior art shown in FIG. 8 with the screw 1 having the aforesaid configuration, the screw may act as follows.

As the extreme end of the rotating screw driver tool 66 abuts against the upper surface 9 of the head part 6 of the screw 1, it is guided into an engaging groove 10 at the central part along the spherical concave surface and thus even if an axial center is slightly displaced, the screw driver tool can be positively installed.

In addition, as shown in FIG. 2, if the edge part of the opening of the engaging groove 10 is provided with the chamferred portions 17, the extreme end of the screw driver tool 66 is smoothly transferred from the spherical concave surface into the engaging groove 10 and then an installation of the screw into the screw driver tool 66 can be further improved.

Accordingly, a rotational torque of the screw driver tool 66 is positively transmitted to the screw 1 so as to get a desired thrust force and at the same time it is possible to prevent the extreme end of the screw driver tool 66 from damaging the engaging groove 10 of the cross-shaped hole.

The screw 1 rotated by the screw driver tool 66 is operated such that the drill part 5 at the extreme end breaks through the protection sheet 64 and pierces into the gypsum board 62, wherein the gypsum plate 63 is punched in sequence, the drill part passes through the protection sheet 65 and performs punching and threading in the steel ground material 61 and then the screw shaft part 4 is threadably fitted into the steel ground material 61.

Figures 6A, 6B:
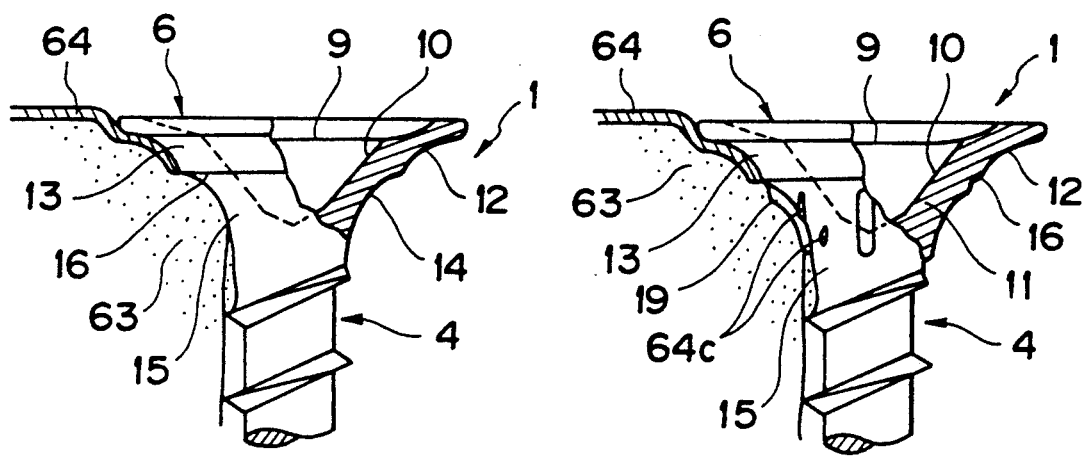
FIG. 6(a) shows a state of use of the screw shown in FIG. 1.

In addition, the seat surfaces 12, 14 of the head part 6 are pushed into the gypsum board 62 punched by the screw shaft part 4, seated and inserted while the upper surface 9 of the head part 6 is being slightly concaved from a surface of the gypsum board 62 as shown in FIG. 6(a).

In this case, the head part 6 is operated such that an initial small diameter part 15 is pushed into the board at a fast speed, its operation is interrupted only for a little while at the annular projecting edge 16, the large diameter part 13 is pushed into the board at a slow speed and a thrusting force is dispersed at the annular projecting edge 16 as an interface, so its thrusting force is required less than that of the prior art screw where the head part is pushed at a time.

That is, the small diameter part 15 is formed such that an initial end of the second seat surface 14 is gradually expanded along the curved concave surface and further the outer diameter at the terminal end of the second seat surface 14 subsequently pushed into the board is smaller than an outer diameter (which corresponds to an outer diameter of the terminal end of the large diameter part 13) of the head part 55 of the prior art screw 50, so that the screw may easily be pushed into the board with a small thrust force. In addition, since the large diameter part 13 is operated such that the annular projecting edge 16 provided at a connection part with the small diameter part 15 has a cutting capability and the pushing action of the screw is interrupted only for a while when the annular projecting edge 16 is pushed into the board, and thereafter the remaining small part of the first seat surface 12 is pushed into the board with a slow speed while the screw is cutting the gypsum 63.

In this way, since a thrusting force for pushing the head part 6 into the board is reduced and an unbalanced state created by a screwing torque against the steel ground material 61 with the drill part 5 is reduced, even if a plate thickness of the steel ground material 61 is thin and the gypsum board 62 has a high hardness, it is possible to prevent the thread formed at the steel ground material 61 from being damaged, the screw from being rotated idle and the screw from being fastened while the upper surface 9 of the head part 6 is being floated up away from the surface of the gypsum board 62, resulting in that a sufficient supporting force can be attained against the gypsum board 62.

In addition, the aforesaid annular projecting edge 16 can effectively perform its function against a shape forming process for the protection sheet 64 with a part broken away by the screw 1.

That is, in case of the shape of the seat surface of the present invention, the aforesaid annular projecting edge 16 cuts the protection sheet 64 wound into the gypsum 63 in the midway thereof so as not to be wound more into the gypsum, the cut extreme end is buried deep into the gypsum board 62 and at the same time the remained protection sheet 64 does not wind around the first seat surface 12 under its non-arranged state or is not pushed out of the outer circumferential edge of the head part and is not brought outwardly, resulting in that the protection sheet is uniformly expanded along the first seat surface 12.

Accordingly, the seated state of the head part 6 upon completion of the fastening operation is stabilized and, a supporting force against the gypsum board 62 is improved, resulting in that quite troublesome removing operations such as a partial cutting of the protection sheet 64 bulged outwardly as found in the prior art or scraping with a sandpaper can be eliminated and a finishing treatment such as a putty coating 67 or an ornamental material 68 can be carried out as it is and a uniform and superior finished surface can be attained.

In addition, as shown in FIGS. 4 and 5, the spot facing projections 19 are projected from an outer circumference of the small diameter part 15, so that the contact areas are remarkably reduced as compared to that of the case in which the entire circumferential surface of the screw contacts the gypsum board 62 as found in the prior art, resulting in that their frictional resistances are reduced and at the same time the head part 6 is pushed while cutting the gypsum board 62 to cause the thrusting force to be further reduced.

As shown in FIG. 6(b), the cut debrises 64c of gypsum or protection sheet can be stored in between the adjoining spot facing projections 19 so as not to be bulged out, resulting in that a stability of the screw in a seated state can be improved.

When the fastening operation with the screw 1 is completed as described above, it is preferable that the upper surface 9 of the head part 6 is slightly recessed or concaved from the surface of the gypsum board 62 due to the aforesaid reasons, and even in the case that the upper surface 9 is in flush with the surface of the gypsum board due to a disturbance caused by various reasons, it is possible to improve an afterward finishing process with the screw 1 having the upper surface 9 of the head part formed into a spherical concave surface.

That is, even if the upper surface 9 of the head part 6 is in flush with the surface of the gypsum board, its outer circumferential edge is a limited fine annular part and the surface of the inner circumference is recessed or concaved from the surface of the gypsum board 62, so that a thickness of the putty coating not peeled off the upper surface 9 of the head part 6 can be assured or kept and a irregularity caused by the projected state of the head part 6 can be corrected.

As apparent from the aforesaid preferred embodiments, the following effects can be expected by the screw of the present invention.

Since formation of the upper surface of the head part into a spherical concave surface enables a screw driver tool to be guided into the engaging groove and positively installed therein, a rotational torque of the screw driver tool is transmitted positively to the screw and at the same time it is possible to prevent the extreme end of the screw driver tool from damaging the engaging groove.

With such an arrangement in which an edge part of an opening of the engaging groove formed at the upper surface of the head part in the spherical concave surface is provided with some chamferred portions for use in guiding the screw driver tool into the engaging groove, an installing characteristic of the screw driver tool can be further improved.

Since the upper surface of the head part made by the spherical concave surface is concaved from the surface of the gypsum board upon completion of the fastening operation, it is possible to correct the irregular projection of the head part in the fastening state and at the same time a thickness of the putty coating can be assured so as not to peel the putty coating off the upper surface of the head part and then an afterward finishing process can be improved more.

The head part is comprised of a large diameter part and a small diameter part provided with the first seat surface and the second seat surface forming the two-stage seat surfaces connected by an annular projecting edge to cause a thrust force to be dispersed at an interface of the annular projecting edge, so that a less thrust force than that obtained by pushing the screw at a time in the prior art is satisfactory. The initial small diameter part is pushed into the board at a fast speed, the pushing of the screw is interrupted only for a while when the cutting with the annular projecting edge is carried out, and thereafter the large diameter part is pushed into the board at a slow speed, resulting in that an unbalanced state with the screwing torque in respect to the steel ground material under an operation of the drilling part together with a reduced thrusting force is decreased. Accordingly, in particular, even in the case that a plate thickness of the steel ground material is thin and the gypsum board has a high hardness, the thread formed at the steel ground material can be prevented from being damaged and the screw is prevented from being fastened while the upper surface of the head part is floated up away from the surface of the gypsum board, resulting in that a sufficient supporting force against the gypsum board can be attained.

Since the protection sheet wound into the gypsum is cut in the midway by the annular projecting edge formed at the seat surface, the cut extreme end is buried deep in the gypsum board and the remained protection sheet is expanded uniformly along the outer circumference of the aforesaid first seat surface, resulting in that a seated state of the head upon completion of the fastening operation is made stable, a supporting force against the gypsum board is improved, a troublesome removing operation against the protection sheet bulged out of the screw as in the prior art is eliminated, and thus a finishing treatment with the putty coating or an ornamental material while keeping its state is carried out and then a uniform and superior finished surface can be attained.

The spot facing projections protruded from an outer circumference of the aforesaid small diameter part may reduce a contact area with the gypsum board and decrease a frictional resistance, and further the head part can be buried while cutting the gypsum board, resulting in that a less thrusting force is satisfactory for the operation and at the same time cut debrises of gypsum or protection sheet or the like are stored in between the adjoining spot facing protections and then a stably seated state can be attained.

The foregoing description is only for an illustration of the present invention, the present invention may provide various modifications without departing from its spirit and the present invention is limited only by the description of the claims.

What is claimed is:

1. A screw comprising a screw shaft part, a drill part with a sharp end at an extreme end of the screw shaft part and a head part arranged at a rear end of said screw shaft part having an inverse truncated cone shape with an outer circumference of a curved concave surface and an upper surface with an engaging groove in which a screw driver tool is adapted to be installed, said upper surface of the head part including an edge part around said engaging groove formed with a spherical concave surface, said head part including a large diameter part extending from an outer circumferential edge of the upper surface to a lower end, and a small diameter part concentrically and integrally connected to the lower end of the large diameter part and extending to said screw shaft part, an outer circumference of said small diameter part constituting a second seat surface forming a part of the curved concave surface and having a large curvature at a terminal end near said large diameter part and a gentle curvature with a diameter gradually decreasing toward said screw shaft part, an outer circumference of said large diameter part constituting a first seat surface forming a part of the curved concave surface and having a diameter gradually decreasing toward the terminal end of said second seat surface with a curvature approximately equal to that near the terminal end of said second seat surface so as to form two-stage curved concave surfaces and an annular projecting edge at a connection part between said first seat surface and said second seat surface.

2. A screw as set forth in claim 1 in which the upper surface of the head part formed into said spherical concave surface is provided with a plurality of inwardly tapered chamfered portions formed by chamfering the edge part of the opening around the engaging groove into a conical form.

3. A screw as set forth in claim 1 in which the small diameter part of said head part is provided with a plurality of spot facing projections extending longitudinally along the spherical concave surface of said second seat surface and equally spaced apart from each other in a circumferential direction so that top portions thereof are located inside an outer circumference of said annular projecting edge.

4. A screw as set forth in claim 1 wherein said screw is a self-tapping screw.

* * * * *

UNITED STATES PATENT AND TRADEMARK OFFICE
CERTIFICATE OF CORRECTION

PATENT NO.   : 5,203,657
DATED        : April 20, 1993
INVENTOR(S)  : Eiichi Nagoshi et al It is certified that error appears in the above-identified patent and that said Letters Patent is hereby corrected as shown below:

In the title page section 21, please change the application number "876,436" to --875,436--.

Signed and Sealed this

Seventh Day of December, 1993

Attest:

BRUCE LEHMAN

Attesting Officer

Commissioner of Patents and Trademarks